United States Patent [19]

Sugimura

[11] Patent Number: 4,733,872
[45] Date of Patent: Mar. 29, 1988

[54] FUSIBLE PACKING FOR A SUPPLY PORT OF AN ACCUMULATOR

[76] Inventor: Nobuyuki Sugimura, 308 Mabase, Shimizu-shi, Shizuoka-ken, Japan

[21] Appl. No.: 874,566

[22] Filed: Jun. 16, 1986

[51] Int. Cl.⁴ .......................... F16J 15/02; F16L 9/00
[52] U.S. Cl. ........................................ 277/26; 138/89; 138/178
[58] Field of Search .................... 277/26; 138/89, 178; 169/42, 57

[56] References Cited

U.S. PATENT DOCUMENTS 2,635,718  4/1953  Birkemeier ................... 169/42 X
3,525,366  8/1970  De Frees ..................... 138/89 X
4,552,222  11/1985 Goans et al. .................. 169/57

FOREIGN PATENT DOCUMENTS 1375647  11/1974  United Kingdom ............... 277/26
1379434  1/1975   United Kingdom ............... 277/26

Primary Examiner—Robert S. Ward
Attorney, Agent, or Firm—Wood, Dalton, Phillips, Mason & Rowe

[57] ABSTRACT

A temperature responsive fusible packing is inserted in a ring shaped space defined between the lower face of a bolt head and the bottom face of a recessed portion formed on the supply port of a gas chamber of an accumulator and then the bolt is tightened, so that the fusible packing can act as a packing which blocks both the gas passage and the inner passage formed through the shank of the bolt. In the event where, the temperature responsive fusible packing should melt due to a fire or the like, since the thus fused packing is expelled outside the device through a gap formed between the wall face of the recessed portion and the outer periphery of the bolt head, a vacant space would be formed there to expose the inner passage to an open air and allows the gas in the gas chamber to be discharged outside.

6 Claims, 13 Drawing Figures

FUSIBLE PACKING FOR A SUPPLY PORT OF AN ACCUMULATOR

BACKGROUND OF THE INVENTION

The present invention relates to a safety device for an accumulator, more particularly, it relates to a device wherein a sealing member which also acts as a temperature responsive sealing member such as packing is fixedly attached to a supply port communicating with a gas chamber, thereby the sealing member such as a fusible packing will melt upon such a temperature rise at the outer circumference as a fire so as to expel the gas in the gas chamber communicating with the supply port to the air outside and thereby prevent the accumulator from bursting due to the pressure rise caused by the expansion of the gas contained in the accumulator itself, and the supply port also displays functions which are originally required.

Heretofore, accumulators of this kind have been provided with, as shown in FIG. 13, at a supply port 1A of a pressure vessel 1, a recessed portion 2 and a gas passage 3, through which supply and discharge of gas are made to and from a gas chamber 4. The passage 3 is opened or closed by a counter sunk head bolt 5 screwed into the supply port from outside toward the inside, and the passage is sealed for the purpose of preventing the leakage of gas through the threaded portion 8, by fitting an O-ring 7 made of rubber or the like into a gap 6 defined between the lower slant face of the bolt 5 and the recessed portion 2.

In a conventional type accumulator, if the bolt 5 is loosened so as to release the gas in the gas chamber to check the gas pressure of the vessel, the O-ring 7 is urged upward by the gas escaping through the threaded portion 8 and is deformed. and further a part of the O-ring would protrude through a gap formed between the recessed portion 2 and the upper part of the bolt head and then would be torn off, therefore, there often occured gas leakage problems, unless the O-ring is replaced with a new one after each gas checking. In other words, the pressure vessel becomes unserviceable, unless replacement of the used O-ring and the filling of gas are done each time after the gas pressure checking has been made.

In addition, the accumulator of conventional type has a construction that it is not able to automatically discharge the gas in the vessel outside, even when the temperature at the outer circumference of the vessel should increase due to a fire or the like accompanying rise of gas pressure in the gas chamber.

That is, since the gap between the bolt 5 outside the O-ring 7 and the recessed portion 2 is set almost zero, it is impossible for the supply port to expel a large amount of gas within a short period of time, even if the O-ring has lost its sealing ability, thereby there is a possible fear that the accumulator in use may burst.

SUMMARY OF THE INVENTION

In view of the above-mentioned drawbacks, the present invention aims to prevent the problems encountered in gas pressure checking from occuring, and at the same time, to improve both the sealing performance and the safety of accumulators.

The present invention is a fusible packing arrangement for a supply port of an accumulator the inventive feature of which resides in that a recessed portion is provided at the supply port of a pressure vessel or container, at which a screwed gas passage is provided, into which a bolt is threadably attached from outside toward inside in such a manner that there is defined a clearance between the inner side wall of the recessed portion and the outer periphery of the bolt head, in addition, there is also formed a space between the lower face of the bolt head and the bottom face of the recessed portion, through which space an inner passage bore which communicates with a gas chamber is provided, and a temperature responsive fusible packing is interposed in the space to act also as a fusible packing. And this fusible packing, under normal condition, blocks both the gas passage and the inner passage, in addition, the deformation thereof is prevented from occuring, moreover, if the temperature surrounding the device increases, the fusible packing would melt and results in a vacant portion to constitute an inner passageway which allows the gas in the gas chamber to be discharged outside the accumulator.

BRIEF DESCRIPTION OF THE DRAWINGS

FIGS. 5 through 12 are sectional side view showing other embodiments of the present invention, respectively, among which FIG. 7 is a sectional plan view showing a part of the fusible packing taken along line VII—VII of FIG. 6

PREFERRED EMBODIMENTS OF THE INVENTION

Figure 1:
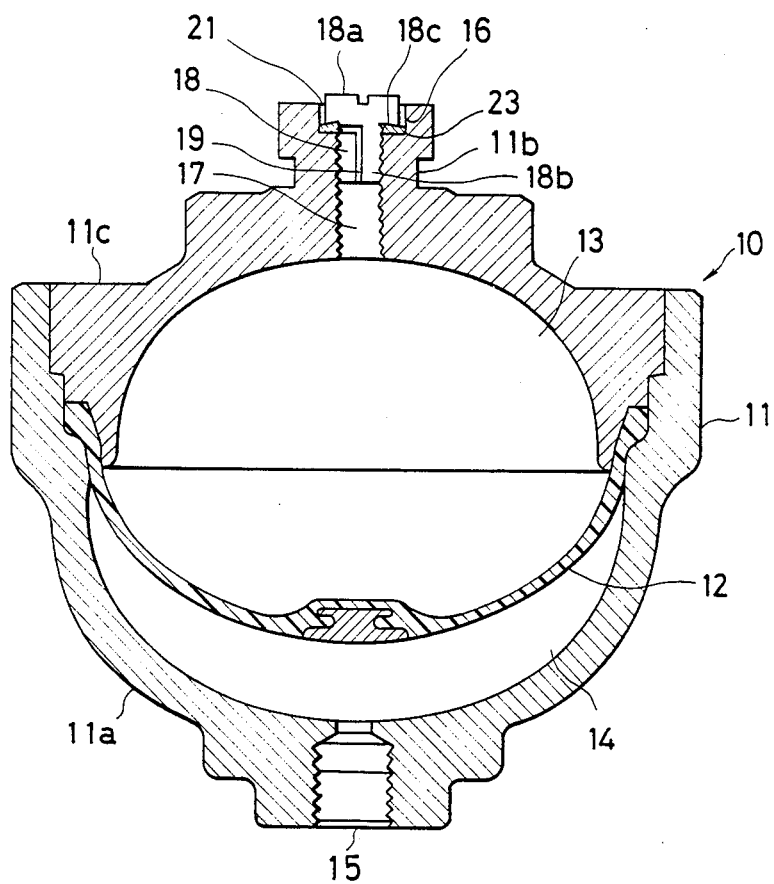
FIG. 1 is a sectional side view showing a preferred embodiment of the present invention.

A first embodiment of the present invention will be explained by referring to the accompanying drawings, in which same reference numerals indicate a member or a portion the same as each other and having same function throughout this specification.

In FIG. 1, numeral 10 denotes an accumulator and 11 a pressure vessel, the interior of which is partitioned by a resilient diaphragm 12 into a gas chamber 13 and a liquid (fluid) chamber 14.

A supply and discharge port 15 for liquid is disposed at the lower part 11a of the pressure vessel defining the liquid chamber, while an annular recess 16 and a gas passage 17 are provided on the supply port 11b at the upper portion of the cover portion 11c of the vessel defining the gas chamber.

The gas passage 17 communicates with the gas chamber 13 via a threaded (18e) hole bored at the central part of the recessed portion 16.

Figure 2:
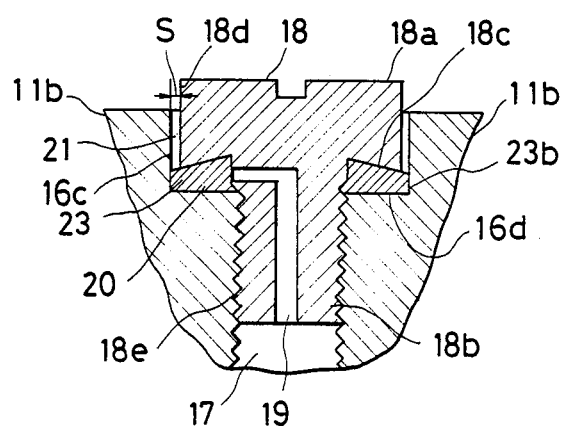
FIG. 2 is an enlarged sectional view of the major part shown in FIG. 1.
Figure 3:
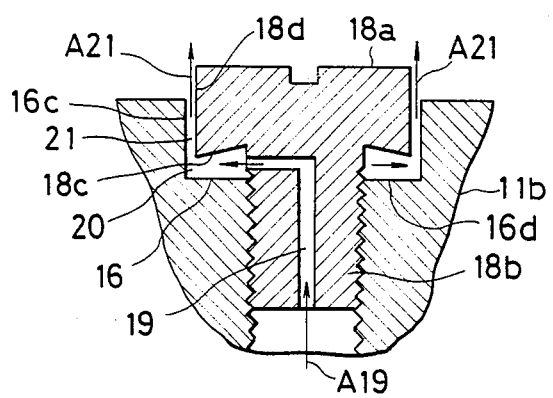
FIG. 3 is a sectional side view showing another state of the device shown in FIG. 2.

18 is a T bolt which consists of, as shown by FIGS. 1, 2 and 3, a bolt head 18a having diameter slightly smaller than the inside diameter of the inner wall of the recessed portion 16, and a shank 18b to be screwed into the threaded (18e) gas passsage 17.

The lower face 18c of the bolt head 18a is formed to have an inclined face radially and inwardly ascending from the lower outside end of the bolt head 18a.

An inner passage 19 is formed at the central part of the bolt shank 18b, which axially extends upward from the bottom and then turns radially outwards upto the exterior of the device.

If one turns the bolt 18 to tighten it from outside the gas hole or passage 17, there can be defined a space 20 having trapezoidal configuration in cross section, as shown in FIG. 3, defined between the lower face 18c of the bolt head and the bottom face 16d of the recessed portion 16. In the drawings, numeral 21 is an outer gas passage which is formed by a clearance S defined between the inside wall face 16c of the recessed portion and the outer periphery 18d of the bolt head.

Figure 4:
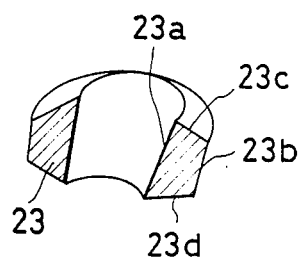
FIG. 4 is a perspective view showing a half part of the fusible packing shown in FIGS. 1 and 2 being axially cut away.

This outer gas passage 21 communicates with the inner passage 19 through the space 20 mentioned above. 23 is a fusible packing of ringular configuration which is tightly inserted in the space 20 and the cross section of which has, as shown in FIG. 4, a trapezoidal configuration having an inner wall 23a longer than the outer wall 23b and its upper face 23c being inclined and the lower face 23d being flat. The temperature responsive fusible packing used in this invention is made, for example, of 12 nylon which melts at a temperature range of 120°-220° C.

Next, the operation of this embodiment will be explained.

A gas supply three way valve (not shown) is mounted to the recessed portion 16, then operation gas such as nitrogen gas is supplied to the gas chamber 13 through the gas passage 17 after the bolt 18 has been loosened by using a box spanner (not shown) and then the bolt 18 is screwed into the screw thread on the gas passage 17. The more the bolt 18 is tightened, the further the fusible packing 23 is urged toward the inner wall 23a of the packing 23, wherein expansion of the packing toward the outer wall 23b is received by the wall face 16c of the recessed portion, thereby the fusible packing will never protrude outwards and displays effective sealing ability even if the clearance S at the outer gas passage 21 may amount to 0.5 mm under a gas pressure of 210 Kg/cm² in the gas chamber 13. Thus the threaded portion 18e and the inner passage 19 are completely sealed by the fusible packing 23.

Radial pressure applied to the fusible packing 23 is received by the wall face 16c of the recessed portion, while the upwardly directed pressure is received by the lower face 18c of the bolt head and thereby the deformation of the fusible packing is completely avoided, on the other hand, should any radial force directed from the inner wall 23a toward the outer wall 23b be applied, the fusible packing 23 of trapezoidal configuration would obtain an increased sealing pressure and display a function as a high pressure sealing member.

Should the temperature at the outer circumference of the accumulator 10 increase due to a fire or the like, the fusible packing 23 would melt and would be blown away through the outer passage 21 by the gas pressure in the gas chamber 13, thereby a vacant space 20 is formed there as shown in FIG. 3, through which the inner passage 19 communicates with the outer passage 21, so that the gas in the gas chamber can flow in the direction as shown by the arrow lines A19 and A21 and can be expelled outside the device, and thereby the pressure vessel can be prevented from bursting and the safety of the vessel can be secured.

At such an instance, the bigger the clearance S of the outer passage 21 is, the higher becomes the safety of the device, because the larger amount of gas can be discharged through the passage.

Figure 5:
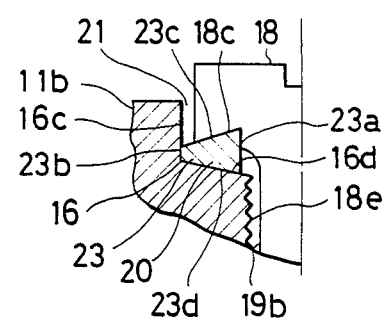
Figure 6:
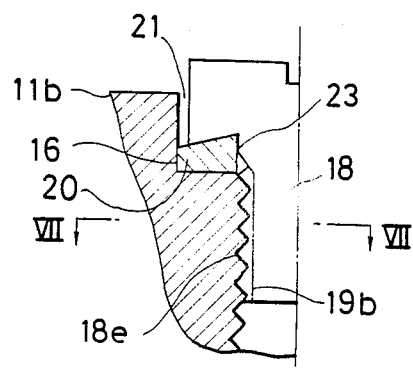
Figure 7:
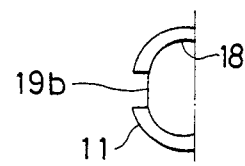

The embodiment of the present invention is not limited to that described in the embodiment explained above, but can be worked in many other way, for example, it can be embodied as shown in FIG. 5, wherein the bottom face 16d of the recessed portion 16 is inclined radially and inwardly to descend downwards, and the lower face 18c of the bolt head 18 is inclined to ascend radially inward so that the two inclined faces define an annular space 20 which can receive a fusible packing of trapezoidal cross section having both the upper face 23c and the lower face 23d being inclined and the inner wall 23a being longer than the outer wall 23b, alternatively, the inner wall 23a can be made smaller than the outer wall 23b and both the upper face 23c and the lower bottom face 23d being inclined in a manner opposite to that shown in the aforesaid embodiment. The inner passage 19b may be formed along the shank of the bolt as shown.

Figure 8:
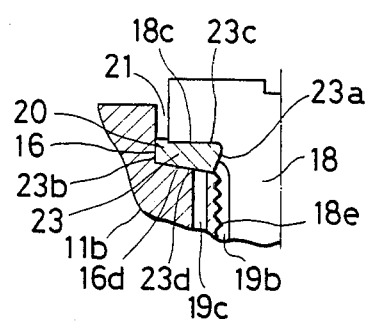

Furthermore, as shown in FIG. 8, the lower face 18c of the bolt head can be made flat and the bottom face 16d of the recessed portion be inclined to descend inward in radial direction also to define an annular space 20, which receives a fusible packing 23 of trapezoidal configuration in cross section having a flat upper face 23c and an inclined bottom face 23d and its inner wall 23a higher than the outer wall 23b, in addition, the supply port portion 11b is provided with an axial bore 19c which communicates with the space 20 and the gas chamber, so that the axial bore 19c can be used as an inner passage. Then the air passage bore can be made larger in cross sectional area capable of discharging larger amount of gas and thereby can improve the safety of the device.

Figure 9:
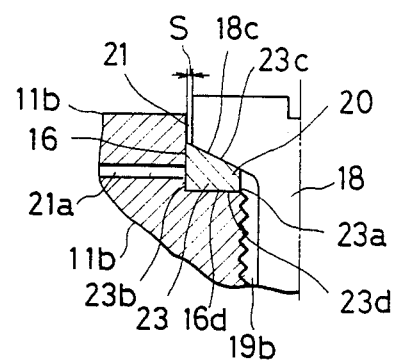
Figure 10:
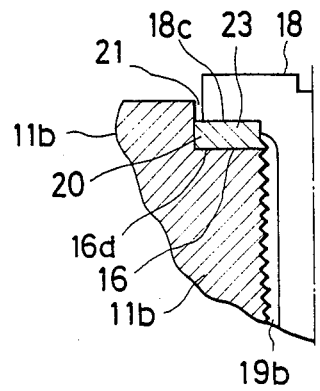

The present invention can be embodied in another way, that is, as shown in FIG. 9, the lower face 18c of the bolt head is inclined to descend radially inward, while the bottom face 16d of the recessed portion 16 is made flat also to constitute a space 20 which receives a fusible packing of a trapezoidal shape in cross section having an inclined upper face 23c and a flat bottom face 23d and its inner wall 23a being shorter than the outer wall 23b, in addition, a transverse bore 21a is opened through the wall of the air supply port 11b which communicates with both the space 20 and the open air outside. And this transverse bore 21a and the clearance S are utilized as an outside air passages. Alternatively, both the lower face 18c of the bolt head and the bottom face 16d of the recessed portion are made flat as shown in FIG. 10 to define a space 20 of rectangular or square cross section, so that it can receive a fusible packing of the same or similar configuration.

In the event where, the clearance S of the outer passage is made smaller due to the design factor, provision of such a transverse bore or bores as 21a of suitable size would secure the safety of the device, because it is effective in increasing the amount of gas to be discharged therethrough.

Figure 11:
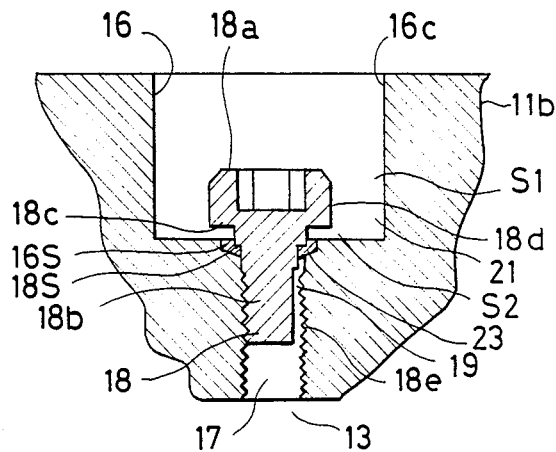

It is also possible, as shown in FIG. 11, to form a recessed portion 16 at the air supply port 11b of the pressure vessel and at the central portion of the recessed portion 16, and further a minor recessed portion 16S is formed, the central part of which is further bored to constitute a gas passage 17 which communicates with the gas chamber 13. In this embodiment, a fusible packing 23 is filled in the minor recessed portion 16S and a bolt 18 is screwed in from outside toward inside to tightly clamp the fusible packing 23.

In this embodiment, the bolt 18 consists of a bolt head 18a having a stepped lower face 18c and a bolt shank 18b, and the lower most face 18S of the stepped lower face 18c urges the fusible packing 23, while the outer passage 21 is constituted by the clearance S1 defined between the inner side wall 16c of the recessed portion and the outer periphery 18d of the bolt head and the space S2 defined between the bottom face 16d of the recessed portion 16 and the lower face 18c of the bolt head.

Figure 12:
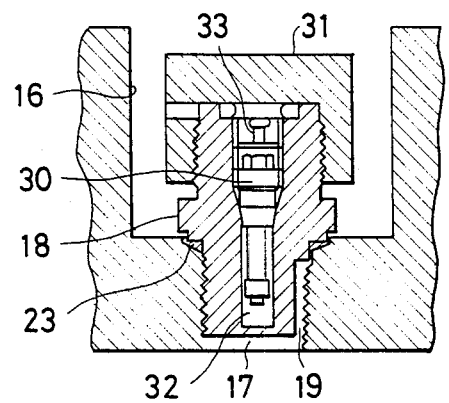
Figure 13:
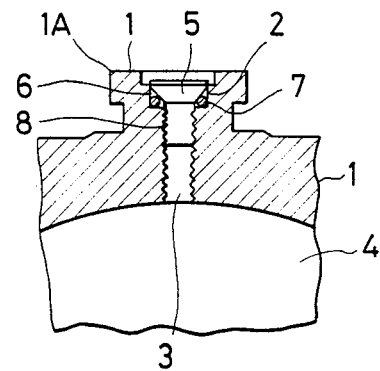
FIG. 13 is a sectional side view showing a prior art supply port.

Although the supply and discharge of the gas is explained to be conducted by means of a three-way gas supply valve throughout all the embodiments mentioned above, it can be replaced with such other means 30 as shown in FIG. 12, which is disposed within a supply and discharge hole 32 passing through the central part of the bolt 18 on the top of which a cover 31 is threadably attached and the opening and the closing of the valve (not shown) is conducted by moving a protrusion 33 up and down.

What I claim is:

1. A fusible packing arrangement disposed in an accumulator at a threaded gas supply port thereof comprising:
   a recessed portion defined at the top portion of said gas supply port;
   a bolt consisting of a bolt head having a diameter smaller than the inside diameter of said recessed portion and a shank threadably fitted to the threaded inner wall of said gas supply port so that there are defined an annular space between the lower face of said bolt head and the bottom face of said recessed portion and also an annular clearance between the outer periphery of said bolt head and the inner side wall of said recessed portion;
   an inner passage extending between the gas passage of the accumulator and said annular space for allowing gas flow therethrough; and
   a temperature responsive fusible packing fitted into said annular space so as to play both roles as a gas packing and a role as a temperature responsive fuse for preventing bursting of the accumulator from occurring in case of fire or the like.

2. A fusible packing arrangement disposed in an accumulator as claimed in claim 1, wherein said fusible packing has a trapezoidal configuration in cross section.

3. A fusible packing arrangement disposed in an accumulator as claimed in claim 1, wherein said fusible packing has a square or rectangular configuration in cross section.

4. A fusible packing arrangement disposed in an accumulator as claimed in claim 1, wherein said inner passage is formed through the shank of said bolt.

5. A fusible packing arrangement disposed in an accumulator as claimed in claim 1, wherein said inner passage is formed through the wall of said supply port of said pressure vessel.

6. A fusible packing arrangement disposed in an accumulator as claimed in claim 1, wherein said annular clearance defined between the outer periphery of said bolt head and the inner wall of said recessed portion constitutes an outer passage.

* * * * *